(12) United States Patent
Yamamoto

(10) Patent No.: US 7,292,373 B2
(45) Date of Patent: Nov. 6, 2007

(54) METHOD AND APPARATUS FOR IMAGE PROCESSING CAPABLE OF HIGH SPEED PROCESSING

(75) Inventor: Toshitsugu Yamamoto, Takatsuki (JP)

(73) Assignee: Minolta Co., Ltd., Osaka-shi, Osaka (JP)

( * ) Notice: Subject to any disclaimer, the term of this patent is extended or adjusted under 35 U.S.C. 154(b) by 1044 days.

(21) Appl. No.: 10/032,446

(22) Filed: Jan. 2, 2002

(65) Prior Publication Data

US 2002/0089696 A1   Jul. 11, 2002

(30) Foreign Application Priority Data

Jan. 9, 2001   (JP)   ............................. 2001-001370

(51) Int. Cl.
*G06K 15/00* (2006.01)
*H04N 1/40* (2006.01)
*H04N 4/405* (2006.01)

(52) U.S. Cl. .................... 358/3.06; 358/3.01; 358/3.03

(58) Field of Classification Search ................. 358/1.9, 358/3.01, 3.03, 3.05, 3.06, 3.21, 3.24; 382/252
See application file for complete search history.

(56) References Cited

U.S. PATENT DOCUMENTS

| 5,045,952 A | 9/1991 | Eschbach |
| 5,696,846 A * | 12/1997 | Shimazaki .................. 382/254 |
| 5,835,238 A * | 11/1998 | Mantell ..................... 358/3.03 |
| 6,172,768 B1 * | 1/2001 | Yamada et al. .............. 358/1.9 |
| 6,501,566 B1 * | 12/2002 | Ishiguro et al. ............ 358/3.05 |

OTHER PUBLICATIONS

Robert W. Floyd et al., "An Adaptive Algorithm for Spatial Greyscale", Proceeding of the S.I.D. vol. 17/2 Second quarter 1976, pp. 75-77.

* cited by examiner

*Primary Examiner*—David Moore
*Assistant Examiner*—James A. Thompson
(74) *Attorney, Agent, or Firm*—Buchanan Ingersoll & Rooney PC

(57) ABSTRACT

In a image processing apparatus executing an error diffusion process, normal error diffusion process is performed when an input pixel value is not "0". When the input value is "0" (white pixel), "0" is automatically output, error memory of the pixel is reset, and calculation and distribution of the error are not performed. Accordingly, the speed of processing of the image processing apparatus can be improved. Further, by setting smaller the threshold value in error diffusion, the influence caused by resetting of the error memory and delay in generating a dot can be prevented.

10 Claims, 15 Drawing Sheets

METHOD AND APPARATUS FOR IMAGE PROCESSING CAPABLE OF HIGH SPEED PROCESSING

This application is based on application No. 2001-1370 filed in Japan, the content of which is hereby incorporated by reference.

BACKGROUND OF THE INVENTION

1. Field of the Invention

The present invention relates to method and apparatus for image processing and, more particularly, to the claimed method and apparatus for image processing capable of high speed processing.

2. Description of the Related Art

An image processing apparatus or a program executing an error diffusion process has been known.

FIG. 15 is a block diagram representing a configuration of a conventional image processing apparatus employing the error diffusion method.

Referring to the figure, the image processing apparatus includes an input unit 501 successively receiving as inputs image signals (input values) representing density of respective pixels; a subtractor 503 reading an error value corresponding to a pixel of interest from an error memory 513 and subtracting the error value from the input value; a thresholding unit 507 thresholding, with a prescribed threshold value, an output (modified input) of subtractor 503; an output unit 509 outputting the result of thresholding (for example, the value 0/1); a subtractor 511 subtracting the output of subtractor 503 from the output of thresholding unit 507; and the error memory 513 distributing the output of subtractor 511 as an error to surrounding pixels and stores.

By the image processing apparatus configured as described above, an error in pixel density resulting from gradation reducing process is diffused. Therefore, it becomes possible to reduce gradations of an image as an object of processing, while maintaining the density of the image as a whole.

The conventional image processing apparatus, however, has a problem that the speed of processing is low.

SUMMARY OF THE INVENTION

Therefore, an object of the present invention is to provide a method and an apparatus for image processing capable of high speed image processing.

In order to attain the above described object, an aspect of the present invention provides an image processing apparatus, including: an input unit successively receiving, as inputs, image signals representing pixels; a determining unit determining whether an input signal represents a white pixel; and an error diffusion processing unit performing different processes depended on whether the input signal represents a white pixel or not.

Preferably, the error diffusion processing unit outputs a signal representing a white pixel, and does not perform subsequent calculation of error and distribution of the error to pixels, when the input signal represents a white pixel.

Preferably, the error diffusion processing unit performs the error diffusion process using a threshold value that is smaller than a central value of values that can be assumed by the image signals.

Preferably, the error diffusion processing unit changes the threshold value in relation to the magnitude of the signal input through the input unit.

Preferably, the error diffusion processing unit performs a process for subtracting a prescribed value before distributing the calculated error, and adding a prescribed value before thresholding.

According to another aspect, the present invention provides an image processing apparatus, including: an input unit successively receiving, as inputs, image signals representing pixels; a determining unit determining whether an input signal represents a black pixel; and an error diffusion processing unit performing different processes depended on whether the input signal represents a black signal or not.

Preferably, the error diffusion processing unit outputs a signal representing a black pixel, and does not perform subsequent calculation of error and distribution of the error to pixels, when the input signal represents a black pixel.

According to a still further aspect, the present invention provides a method of image processing, including the steps of: successively inputting image signals representing pixels; determining whether an input signal represents a white pixel or a black pixel; and error diffusion process step performing different processes dependent on whether the input signal represents either white or black pixel or not.

According to another aspect, the present invention provides a recording medium recording an image processing program, for realizing the above described method.

According to another aspect, the present invention provides a method of image processing, including the steps of successively inputting image signals representing pixels; determining whether an input signal represents a white pixel; and error diffusion process step performing different processes dependent on whether the input signal represents a white pixel or not.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Most of the images (particularly, images of business documents) are largely occupied by white pixels. When half tone processing is performed using the error diffusion method, the speed of image processing would be significantly improved if distribution of error is stopped for white pixels.

Therefore, in the image processing apparatus in accordance with an embodiment of the present invention, a normal error diffusion process is performed when the input is not "0" (white), and error diffusion is not performed but "0" is output when the input is "0". By adopting such a configuration, the speed of image processing can significantly be improved. By the following approach, image quality can also be improved.

In such a structure as described above, in which normal error diffusion process is performed when the input is not "0" and error diffusion is not performed but "0" is output when the input is "0", there arises a problem of how to address the errors accumulated in the error memory. Assume, for example, that an image including white pixels (pixels of which input value is "0") is processed by the conventional error diffusion method.

When the input is close to "0", an average value of error values becomes approximately equal to the threshold value. When the error value of the pixel of interest in the error memory is cleared at this time, there would be a contradiction in the relation with other pixels. When the error value of the pixel of interest in the error memory is left as it is, the error will be distributed to an unrelated pixel (for example, a pixel at a far distance).

How the aforementioned program occurs when the input is close to "0" will be described in detail, with reference to the figures.

Figure 15:
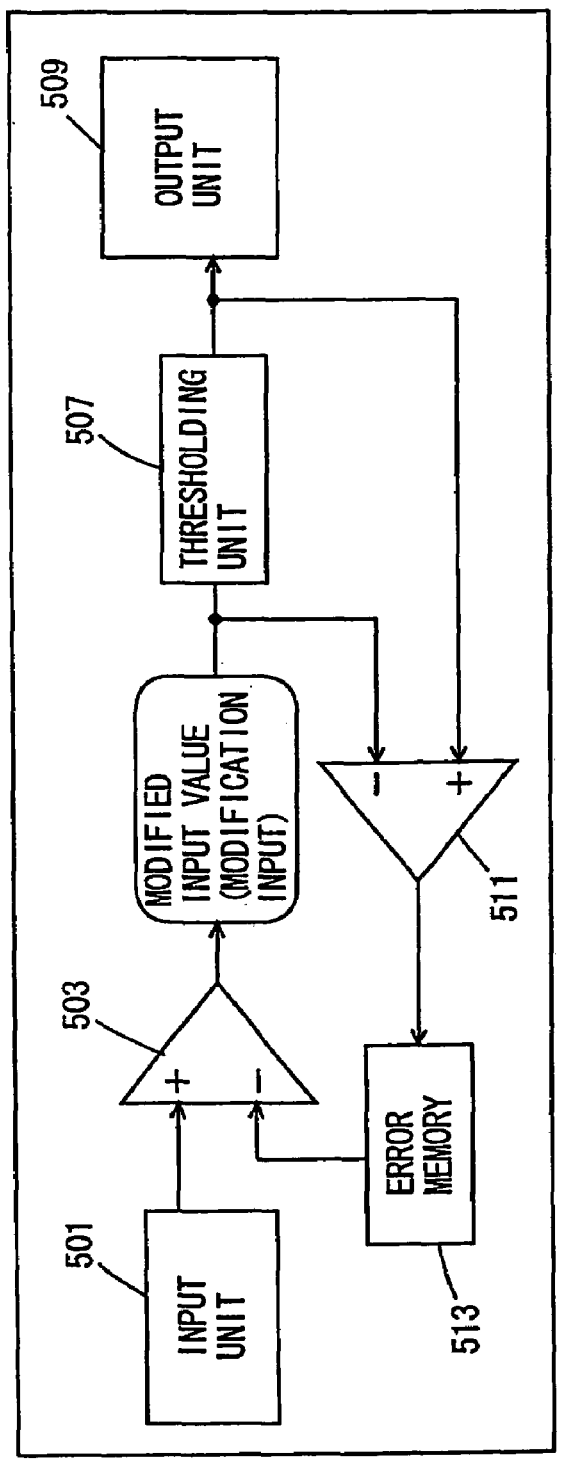
FIG. 15 is a block diagram representing a configuration of an image processing apparatus employing the error diffusion method.
Figure 16:
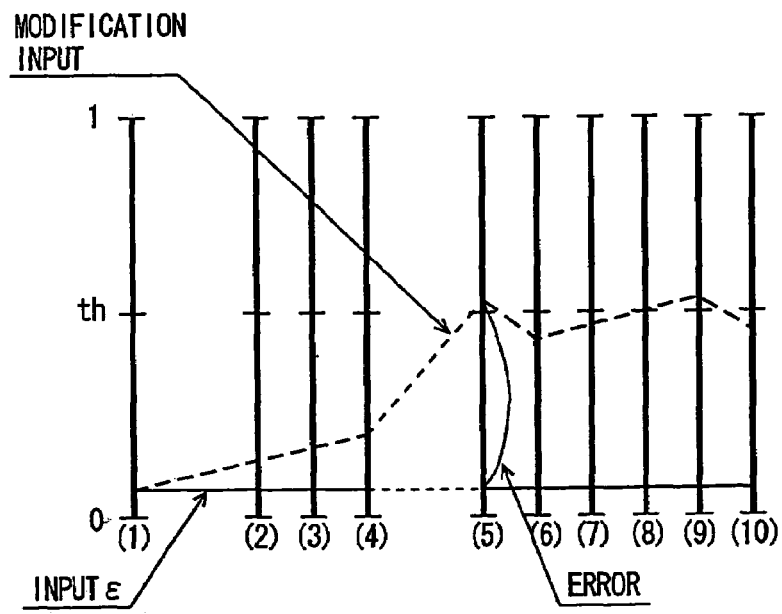
FIG. 16 is an illustration representing an error when the input is close to "zero".

Referring to FIG. 16, assume that the input may be in the range of 0 to 1. The threshold value is represented by th. Further, it is assumed that pixel values are input successively to the image processing apparatus starting from pixel (1), and subjected to binarization process. When the input is $\epsilon$ (a small value not "0"), "0" is output in the processing of pixels (1) to (4). During this process, errors are accumulated, and therefore, a modification input (output of subtractor 503 shown in FIG. 15) increases gradually.

As the modification input exceeds the threshold value th at pixel (5), "1" is output, and the error decreases. By repeating this operation, the error in the error memory comes to have a value close to the threshold value th and stabilized.

Figure 17:
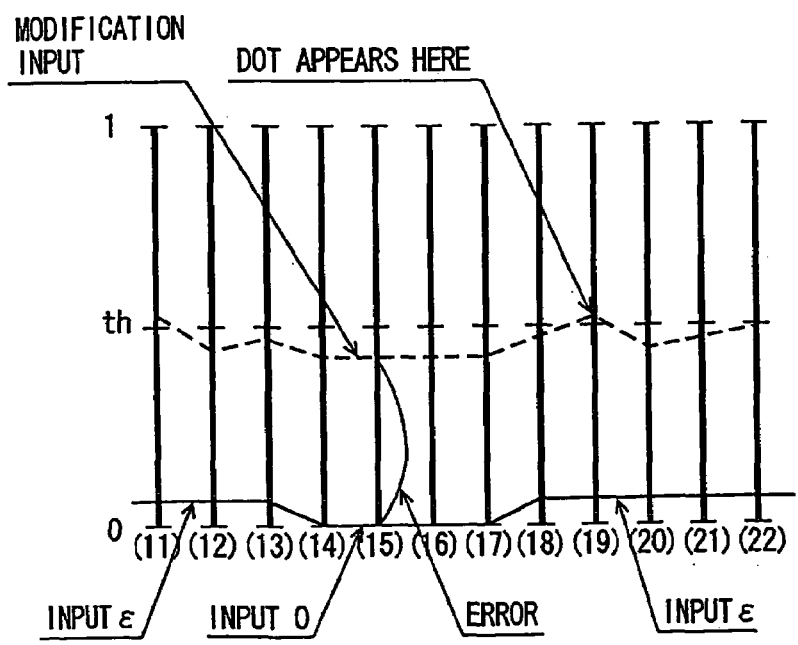
FIG. 17 is an illustration representing a process when the input changes from "zero" to $\epsilon$.

When the input changes to "0" as represented by (14) in FIG. 17 after the stable state is attained, it will be input=output="0", and therefore the accumulated errors are maintained as they are until the input changes (until pixel (18)).

This is true no matter how many pixels of which input is "0" continues. When the input assumes a value other than "0" (after pixel (18)), the modification input still remains close to the threshold value th. Therefore, a dot is output immediately (pixel (19)).

Figure 18:
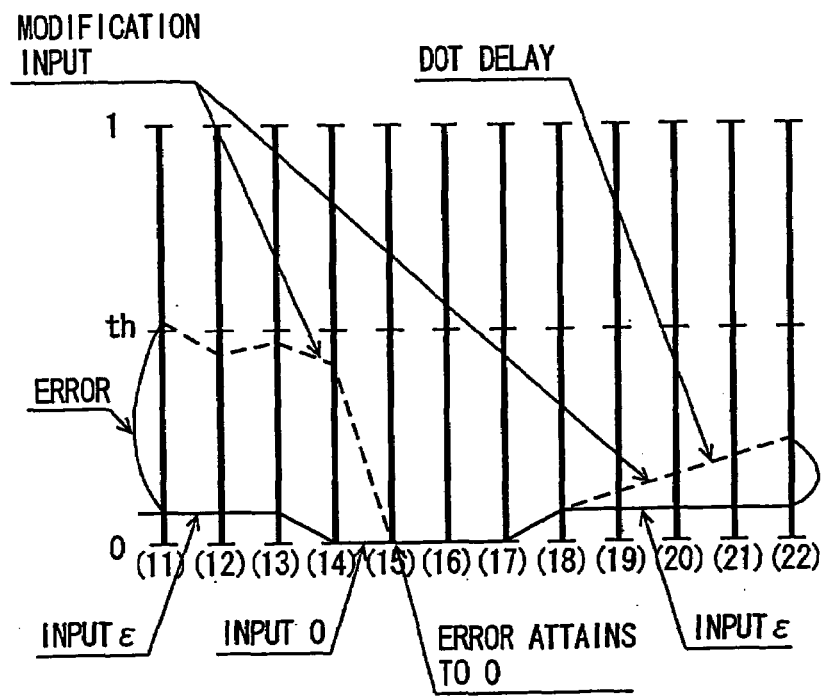
FIG. 18 is an illustration representing a problem experienced when the error memory is reset.

When distribution of the error is stopped and the error memory is cleared when the input assumes "0" as represented by (14) and the following of FIG. 18, the error will be "0", and hence input=modification input=output="0".

When the input again returns to $\epsilon$ as represented by the pixel (18), accumulation of errors start again from this state. No dot is output until the modification input exceeds the threshold value th. Therefore, generation of a dot delays.

Figure 19:
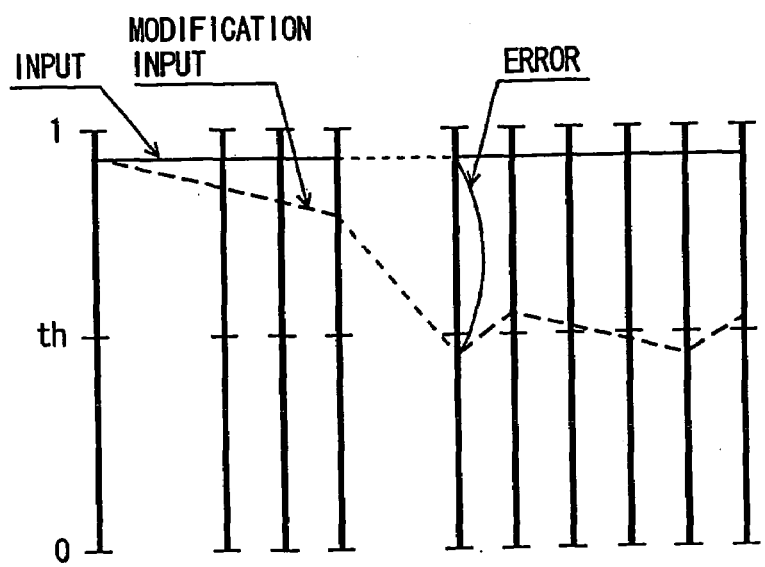
FIG. 19 represents an error when the input is close to "1".

Similarly, referring to FIG. 19, when the input value is 1–68, which is large but not 1, the error in the error memory comes to have a value close to the threshold value th and stabilized.

Figure 20:
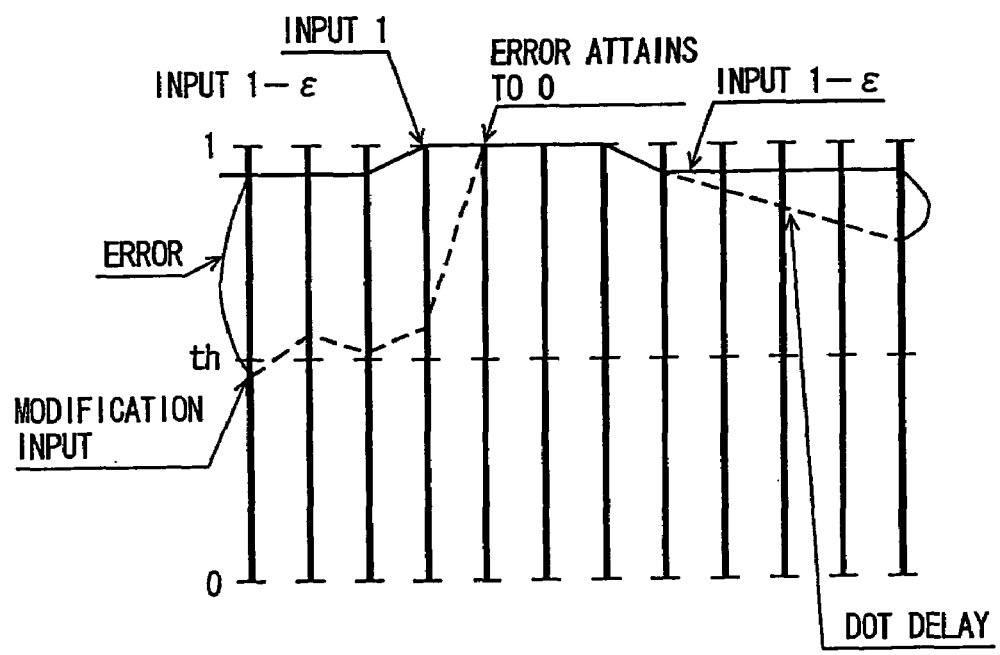
FIG. 20 is an illustration representing a problem experienced when the error memory is reset.

Referring to FIG. 20, if the error memory is cleared when the input assumes "1", the error will be "0". Thereafter, when the input again assumes 1–$\epsilon$, the state of "no dot" is not attained until the modification input exceeds the threshold value (becomes equal to or lower than the value). Therefore, generation of a white pixel delays.

As described above, when the error memory is cleared, generation of a dot (or generation of a white pixel) delays.

It seems that such a problem can be solved simply by not clearing the error memory. When the error memory is not cleared, however, errors generated from the pixels would be distributed to unrelated pixels, resulting in an image of lower quality.

Figure 21:
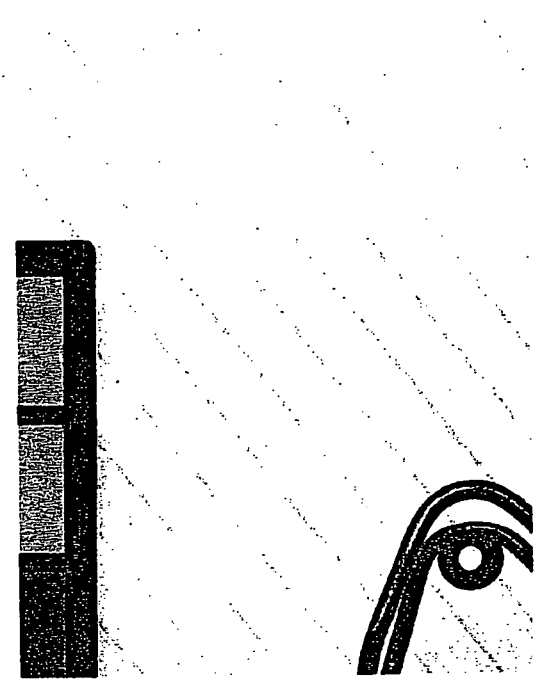
FIG. 21 represents a sample image as an object of processing.

FIG. 21 shows a specific image sample as the object of processing. This image includes a plurality of lines extending in a direction from upper left to lower right. Further, background of the sample image has a gradation, which is denser at a lower portion.

Figure 22:
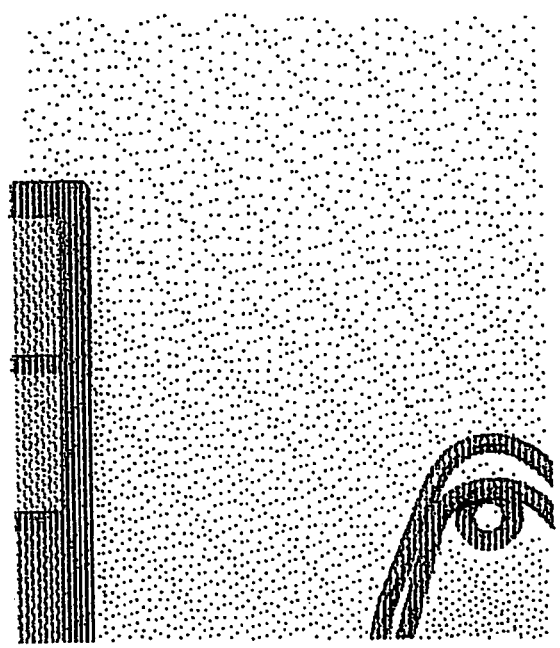
FIG. 22 shows the image of FIG. 21 processed by the conventional error diffusion method.

FIG. 22 shows the result of processing of the sample image shown in FIG. 21 by the conventional error diffusion process. In this example, the original image can be reproduced fairly satisfactory. The speed of image processing, however, is low, as error diffusion process is performed on white pixels in the sample image also.

Figure 23:
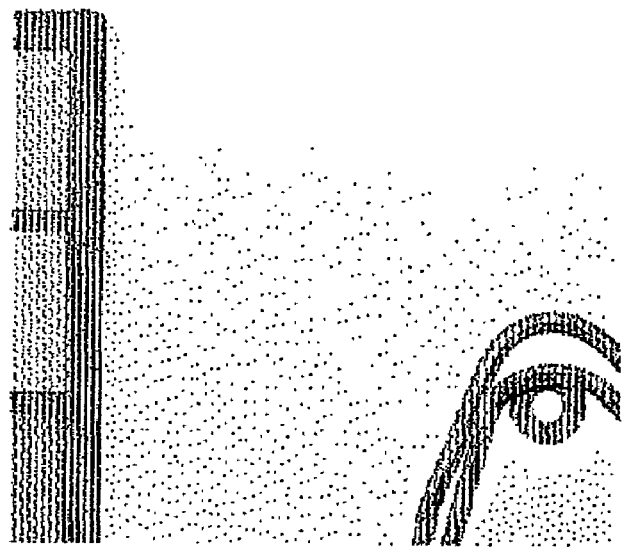
FIG. 23 shows the result of image processing with the error memory cleared when the input is "0".

FIG. 23 shows the result of processing of the sample image shown in FIG. 21, in which error diffusion is not performed when the input (pixel value) is "0" and the error memory is cleared.

As already described with reference to FIG. 18, once the input assumes "0", dot is not output for a while thereafter, and therefore, reproductivity of the original image is not satisfactory in this example.

Figure 24:
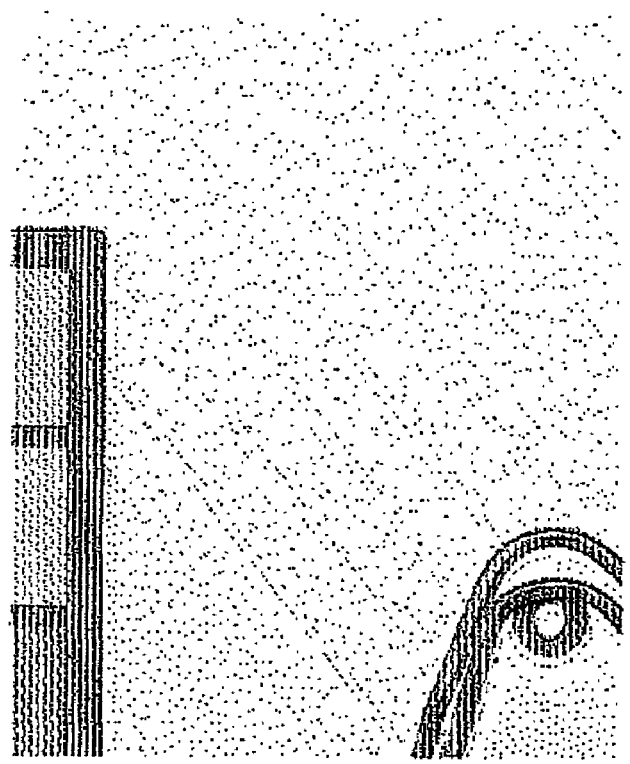
FIG. 24 shows the result of image processing with the value of the error memory maintained when the input is "0".

FIG. 24 shows the result of image processing where error diffusion is not performed when the input (pixel value) is "0" and the value of the error memory is kept as it is. In this example, errors of pixels not related at all are distributed in the error diffusion process, and therefore, the original image cannot be well reproduced either.

The present embodiment provides an image processing apparatus that solves the above described problem and enables high speed image processing without degrading image quality. For this purpose, in the image processing apparatus of the present embodiment, whether the input is "0" (white pixel) or not is determined, and different processes are performed dependent on whether it is "0" or not. More preferably, when the input is not "0", the normal error diffusion process is performed, and when the input is "0", the value "0" is output directly and the error memory is cleared, so that calculation of error and subsequent distribution of the error to pixels are not performed.

Further, a threshold value that is smaller than the central value of possible values of the input signal (threshold value used in the normal error diffusion process) is used, in order to prevent disadvantages resulting from not distributing the error.

Figure 1:
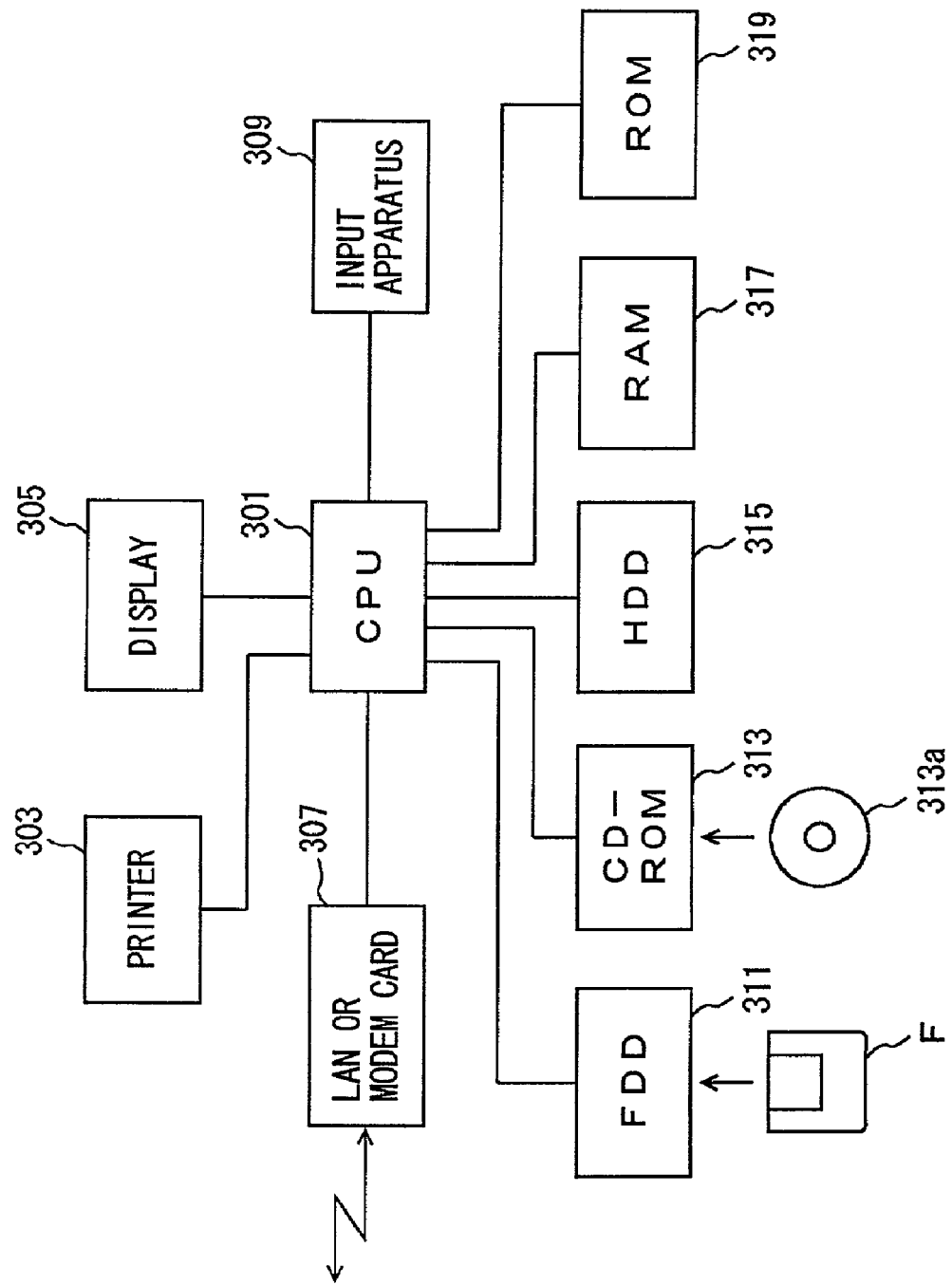
FIG. 1 is a block diagram representing a hard ware configuration of an image processing apparatus in accordance with a first embodiment of the present invention.

FIG. 1 is a block diagram representing a hardware configuration of the image processing apparatus in accordance with the first embodiment of the present invention.

Referring to the figure, the image processing apparatus includes: a CPU 301 controlling the overall apparatus; a printer 303 for outputting an image; a display 305 for displaying an image; an LAN or modem card 307 for communication with external apparatuses; an input apparatus 309 such as a keyboard or a mouse, a floppy disk drive 311; a CD-ROM drive 313; a hard disk drive 315; an RAM 317; and an ROM 319.

A program or the image processing apparatus to execute the method of image processing may be provided by a floppy disk F inserted to floppy disk drive 311, a CD-ROM 313a inserted to CD-ROM drive 313 or the like. Such an image processing program may also be obtained through LAN or modem card 307.

Figures 2, 3:
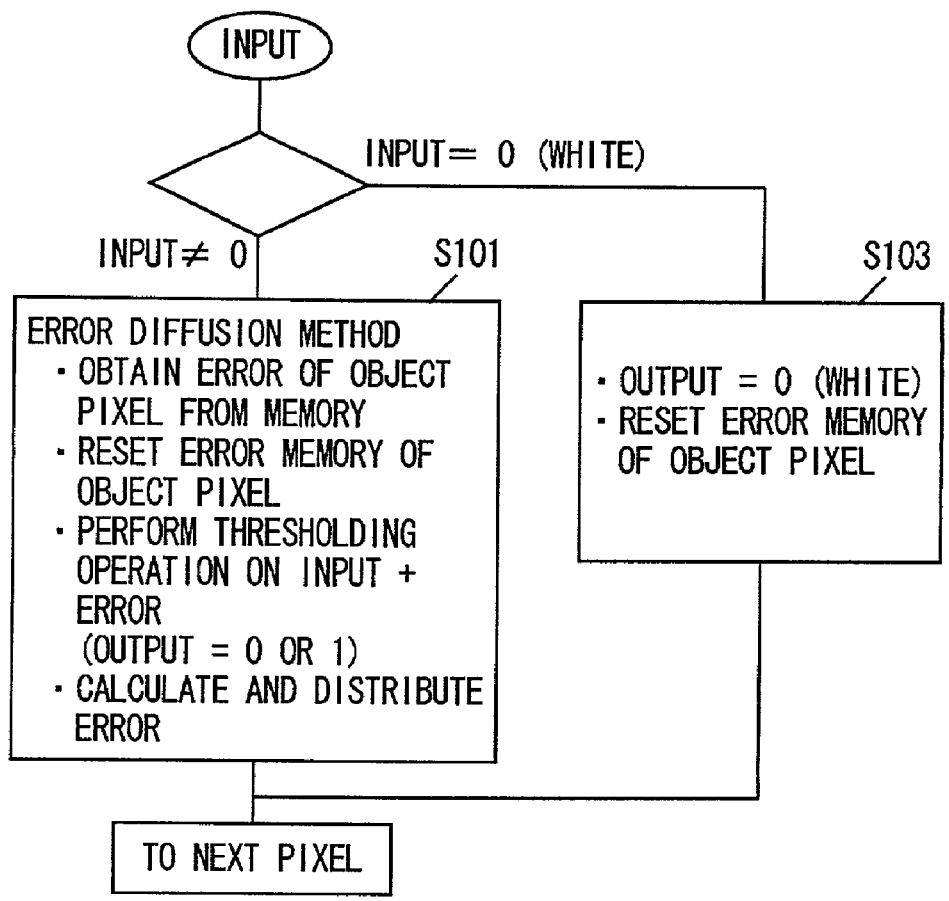
FIG. 2 is a flow chart representing the process in accordance with the first embodiment.
FIG. 3 is an illustration representing an operation of the error memory.

FIG. 2 is a flow chart representing the process performed by the image processing apparatus shown in FIG. 1.

Referring to the figure, the image processing apparatus determines whether the input (pixel value) is "0" or not. If the input is not "0", image processing using the normal error diffusion method is performed in step S101.

More specifically, in step S101, the processes are performed in which an error of the pixel of interest is obtained from the error memory, and the error memory of the pixel of interest is reset accordingly. Further, the value of the input plus the obtained error (modification input) is thresholded, and 0 or 1 is output. Thereafter, the modification input is subtracted from the output, and the result is distributed as an error to error memories of surrounding pixels. Thereafter, processing of the next pixel starts.

When the input is "0", the output is set to "0" (white pixel) in step S103. Calculation and distribution of the error are not performed, and the error memory of the pixel of interest is reset.

FIG. 3 is an illustration representing the operation of the error memory (in the present embodiment, corresponding to RAM 317 of FIG. 1).

Referring to the figure, when we represent the position in the error memory corresponding to the pixel as an object of processing is represented by * a, in the process shown in step S101 of FIG. 2, first, the error recorded at the position * a of the error memory is read. Then, the content of the position * a of the error memory is cleared (reset).

After the input +read error (=modification threshold value) is thresholded by the threshold value th and a value obtained by subtracting the modification threshold value from the result of thresholding is regarded as the error resulting from the processing of the pixel of interest, it is recorded (added to the already recorded value) at positions (for example, b to m) of the surrounding pixels in the error memory, in accordance with a prescribed weight coefficient.

When the input is "0" (step S103 of FIG. 2), the output is set to "0". The position (* a) corresponding to the pixel which is the object of processing in the error memory is cleared, and error propagation is not performed.

Figure 4:
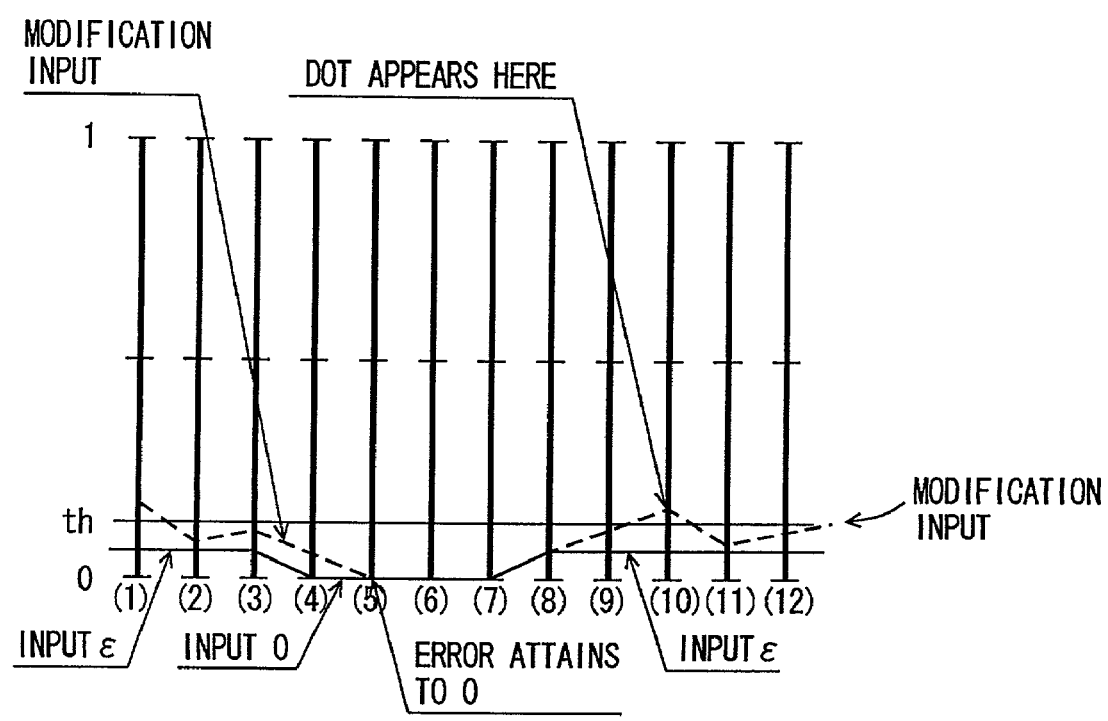
FIG. 4 is an illustration representing the effect of the first embodiment.

Referring to FIG. 4, in the present embodiment, the threshold value th is set smaller than in the prior art. Therefore, when the input is small, the error is stabilized at a small value. Therefore, the influence is limited even when the error memory is cleared.

When the input changes from a small value $\epsilon$ to 0 (pixel (4) of FIG. 4), the error memory is reset pixel (5)). When the input again assumes a value other than 0 (pixel (8)), however, the modification input immediately exceeds the threshold value th. Thus, the delay in dot generation can be eliminated.

Even when the threshold value th is set small, density can correctly be reproduced in the error diffusion method.

The threshold value may be set small, only when the input is small (equal to or smaller than a prescribed value).

Figure 5:
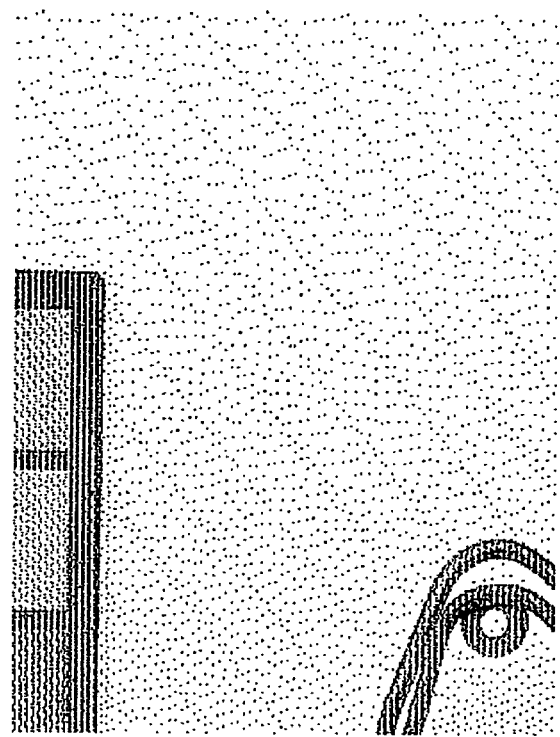
FIG. 5 shows the result of image processing in accordance with the first embodiment.

FIG. 5 shows the result of processing the image of FIG. 21 in accordance with the present invention, where the threshold value th is set to th=0.2.

As can be seen from the figure, according to the present embodiment, the problem (FIG. 23) experienced when the error memory is cleared can be solved, as the threshold value is set small.

Further, according to the present embodiment, distortion (especially, see an upper edge portion of the image) at the peripherally of the image can be reduced as compared with the processing (FIG. 22) in accordance with the conventional error diffusion method.

Second Embodiment

Figure 6:
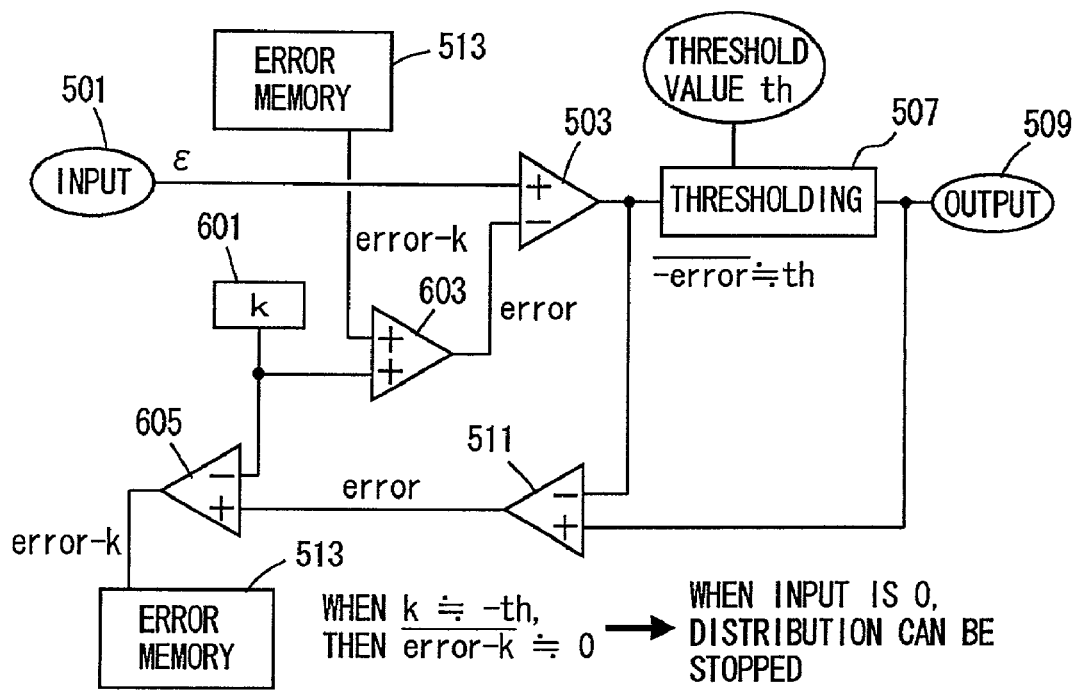
FIG. 6 is a block diagram representing a configuration of an image processing apparatus in accordance with a second embodiment.

FIG. 6 is a block diagram representing a configuration of the image processing apparatus in accordance with the second embodiment of the present invention.

Referring to the figure, the image processing apparatus includes, in addition to the configuration of the image processing apparatus shown in FIG. 15, an adder 603 adding a constant k to the value read from error memory 513, a subtractor 605 subtracting the constant k from the error prior to the storage in error memory 513, and an output unit 601 outputting the constant k.

In the present embodiment also, as in the processing shown in FIG. 2, the normal error diffusion process is performed (S101) when the input is not "0", an 0 is output and the error memory of the pixel of interest is reset (S103) when the input is "0".

When the input is small, in order that the value in the error memory 513 is stabilized at a small value, a constant k is subtracted before the error is stored in the error memory, in the present embodiment. Therefore, the value stored in the error memory can be made smaller.

When the error is taken out from the error memory and used, the constant k is added. Therefore, correct error diffusion is possible.

Figure 7:
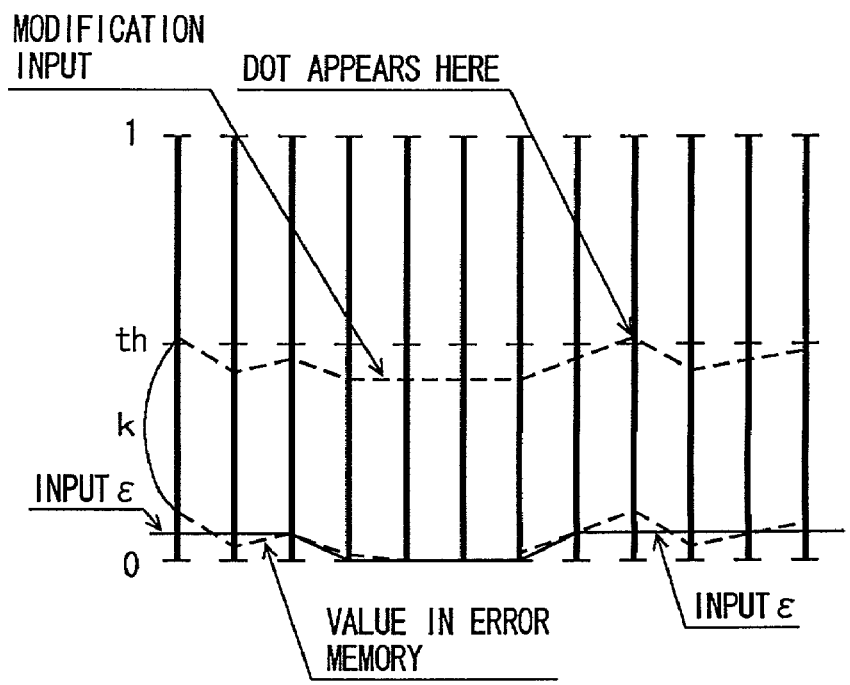
FIG. 7 represents effects of the second embodiment.

Particularly, when the input is small, the value in the error memory when the input is small can be reduced (to almost 0) as shown in FIG. 7, by setting the absolute value of k to be slightly smaller than th. Therefore, even if the error is not distributed and the memory is cleared when the input is 0, the influence is limited.

Figure 8:
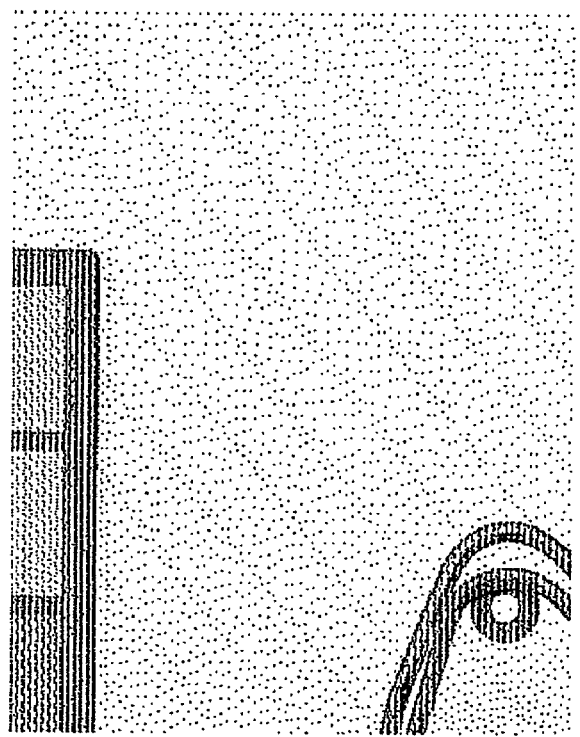
FIG. 8 represents the result of image processing in accordance with the second embodiment.

FIG. 8 shows the result of processing the image of FIG. 21, when the constant k=−0.45 and threshold value th=0.5, in the present embodiment. In the present embodiment also, the value in the error memory can be made small, and therefore, problems experienced when the memory value is cleared can be minimized.

Further, as compared with the processing (FIG. 22) of the conventional error diffusion method, distortion at the peripheral portion of the image can be suppressed also by the present embodiment.

Third Embodiment

The present invention is also applicable to the image processing apparatus using the threshold value diffusing process proposed by the applicant of the present application in Japanese Patent Laying-Open No. 2000-165669 (U.S. Ser. No. 09/399,180).

Figure 9:
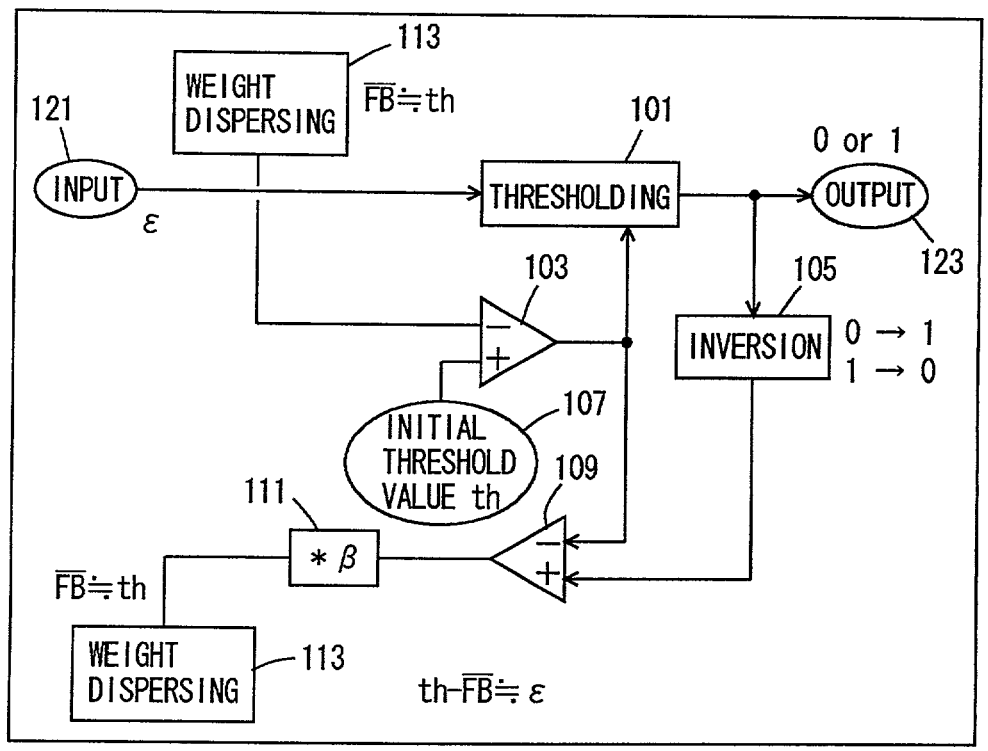
FIG. 9 is a block diagram representing a configuration of an image processing apparatus employing the threshold value diffusion method.

FIG. 9 is a block diagram representing a configuration of the image processing apparatus using the threshold value diffusing process.

Referring to the figure, the image processing apparatus includes: an input unit 121 receiving pixel values as inputs; an output unit 123 outputting the binarized value of 0 or 1; and a thresholding processing unit 101 performing thresholding operation on the input value input through input unit 121, based on the threshold value.

The image processing apparatus further includes: an output unit 107 outputting an initial threshold value th; a subtractor 103 subtracting an error of a weighted and distributed threshold value from the initial threshed value th; an inverting unit 105 inverting the result of thresholding; a subtractor 109 subtracting an output of subtractor 103 from the output of inverting unit 105; a β multiplication unit 111 multiplying the output of subtractor 109 by a coefficient β; and a weight dispersing memory 113 for dispersing the output of β multiplication unit 111 to the threshold values corresponding to surrounding pixels.

In the error diffusion process, the difference between the modification input and the output is distributed as an error, to surrounding pixel values. In the threshold value diffusing process, the difference between an inverted value of the output and the threshold value used for processing the pixel is dispersed to the threshold values for processing surrounding pixels.

Figure 10:
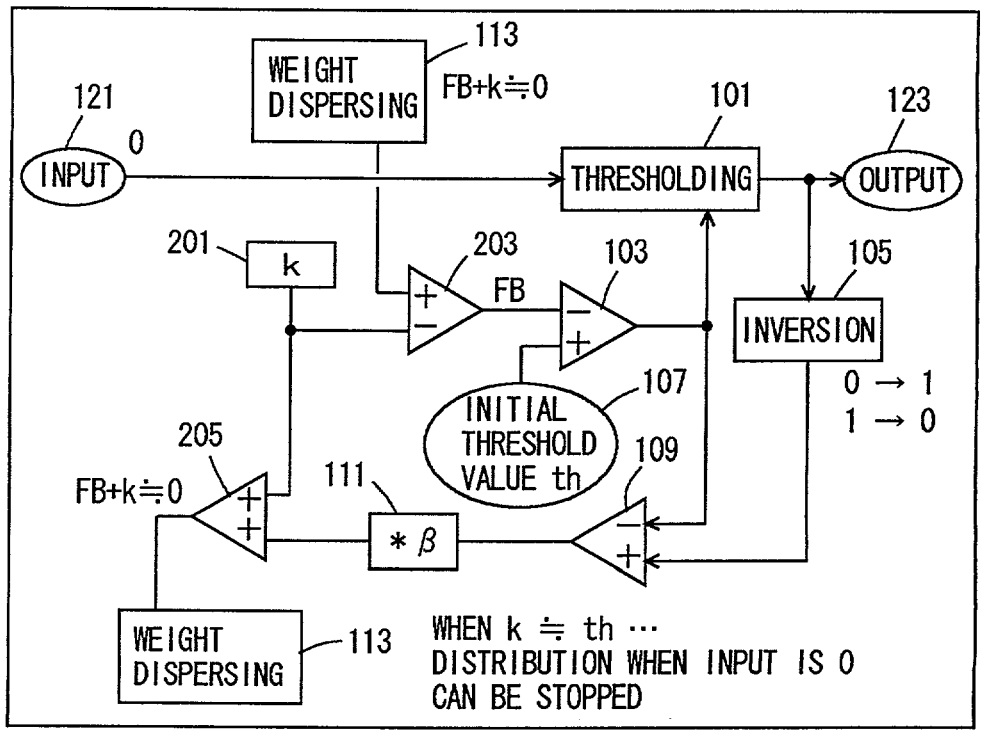
FIG. 10 is a block diagram representing a configuration of an image processing apparatus in accordance with a third embodiment.

FIG. 10 is a block diagram representing the configuration of the image processing apparatus in accordance with the third embodiment of the present invention.

Referring to the figure, in the present embodiment, the image processing apparatus includes, in addition to the configuration of the apparatus employing the threshold value diffusing method shown in FIG. 9, a k output unit 201 outputting a constant k, an adder 205 adding the constant k to the output of β multiplication unit 111, and a subtractor 203 subtracting the constant k when a value is read from the weight dispersing memory 113.

In the present embodiment also, when the input is "0" is automatically output, and the memory is cleared, and therefore the error in binarization is not distributed. In the present embodiment, however, a constant k is added when a value is recorded in the weight dispersing memory 113, and the constant k is subtracted when a value is output from the weight dispersing memory 113. Therefore, the value in the weight dispersing memory 113 can be made smaller, and therefore the influence caused by clearing the contents thereof can be reduced.

Fourth Embodiment

The hardware configuration of the image processing apparatus in accordance with the fourth embodiment is the same as that of the first embodiment. Therefore, description thereof will not be repeated.

Figure 11:
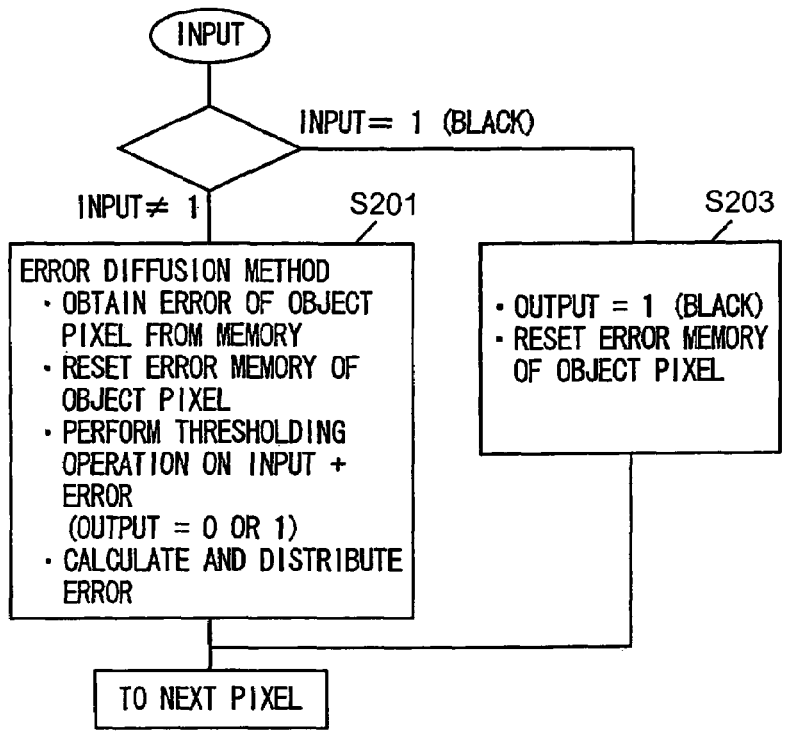
FIG. 11 is a flow chart representing a process of an image processing apparatus in accordance with a fourth embodiment.

In the fourth embodiment, in place of the process shown in the flow chart of FIG. 2, the process shown in the flow chart of FIG. 11 is executed.

More specifically, referring to FIG. 11, when the input is not "1", normal error diffusion process is performed. When the input is "1" (black pixel), "1" is automatically output, and the error memory of the pixel of interest is reset. Therefore, error diffusion process need not be performed when the input is "1". Thus, the speed of image processing is improved.

Figure 12:
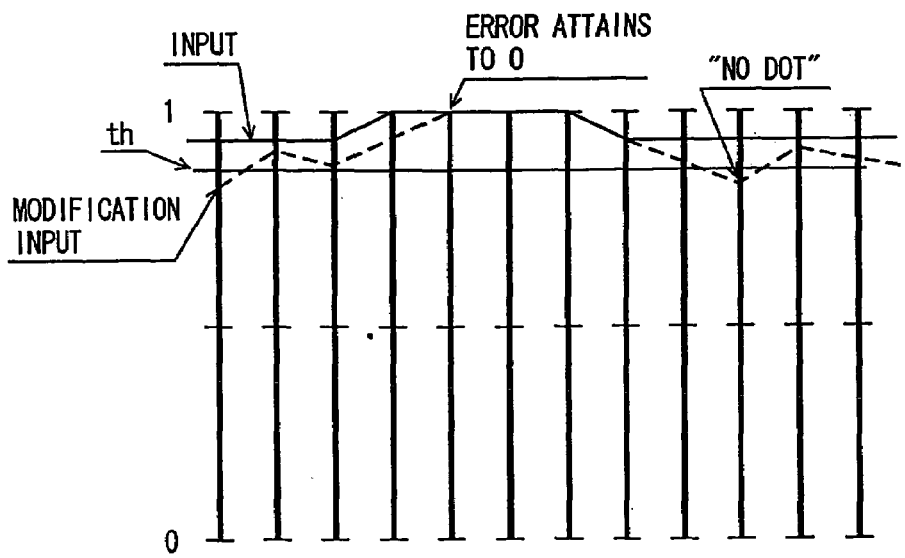
FIG. 12 represents the effects in accordance with the fourth embodiment.

In the present embodiment, the threshold value th is set larger than the central value of the input values, as shown in FIG. 12. As the threshold value is set larger, even when the accumulated errors are reset when the input changes from a state close to "1" to "1", the influence thereof (delay in generating a white pixel) can be minimized. More specifically, when the input changes from "1" to a value not "1", the modification input immediately exceeds the threshold value th (becomes equal to or lower than the threshold value th), and therefore, the delay in generating a white pixel can be prevented.

Fifth Embodiment

The hardware configuration of the image processing apparatus in accordance with the fifth embodiment, is the same as that of the image processing apparatus in accordance with the first embodiment. Therefore, description thereof will not be repeated.

Figure 13:
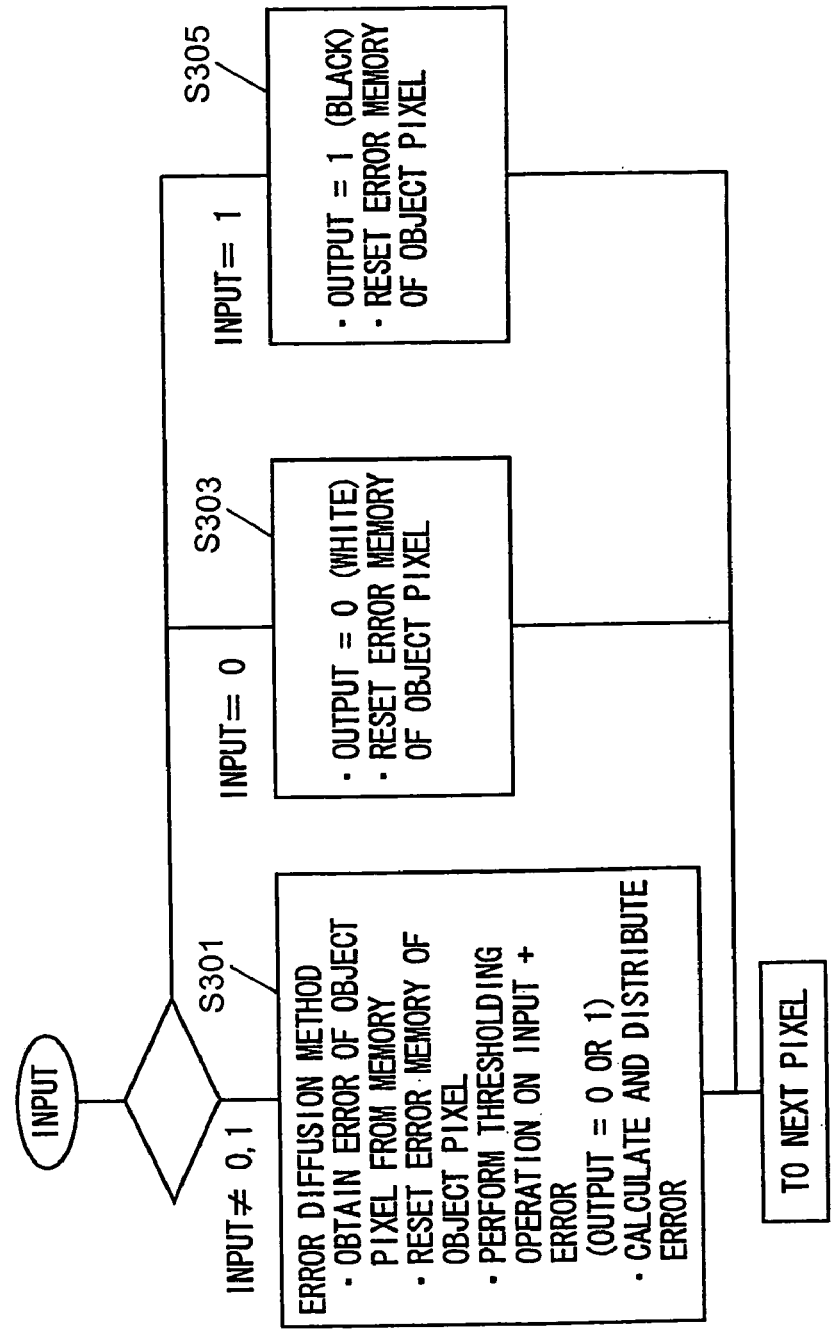
FIG. 13 is a flow chart representing the process performed by an image processing apparatus in accordance with a fifth embodiment.

In the image processing apparatus in accordance with the fifth emboimdnet, in place of the process shown in FIG. 2, the process shown by the flow chart of FIG. 13 is executed.

More specifically, when the input is neither "0" nor "1", the normal error diffusion is performed. By contrast, when the input is "0", the process similar to the first embodiment is performed, in which "0" is output and the error memory of the pixel of interest is reset. When the input is "1", "1" is output and the error memory of the pixel of interest is reset, in the similar manner as the fourth embodiment.

More specifically, in the present embodiment, when the input is "0" or "1", the error diffusion process is not performed, and the error memory is reset.

Figure 14:
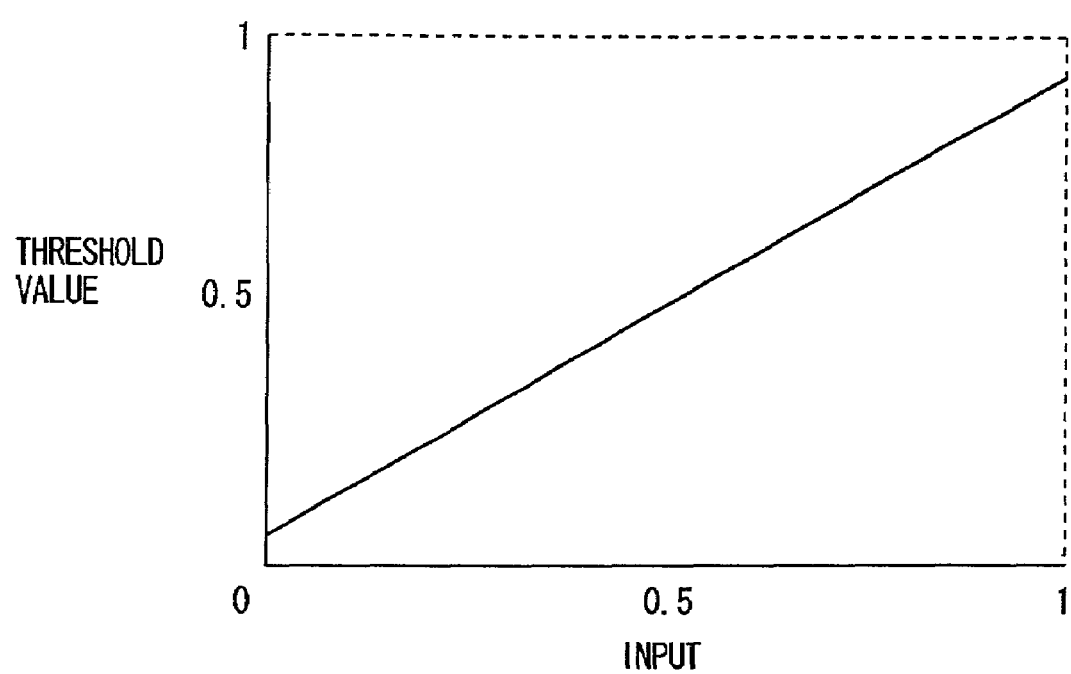
FIG. 14 is an illustration representing the method of controlling threshold value performed by the image processing apparatus in accordance with the fifth embodiment.

Further, in the present embodiment, the threshold value is changed in accordance with the input, so that a proportional relation holds between the input and the threshold value, as shown in FIG. 14. Therefore, when the input is small, the threshold value can be made smaller accordingly, and when the input is large, the threshold value can be made large accordingly. Therefore, when the input is small, the threshold value is also small, and therefore even when the error is not distributed but cleared when the input is "0", the influence is limited, as in the process shown in FIG. 4.

On the contrary, when the input is large, the threshold value is also large, and therefore even when the error is not distributed but cleared when the input is "1", the influence is limited as in the example of FIG. 12.

EFFECTS OF THE EMBODIMENTS

As described above, in the above described embodiments, the image processing apparatus is configured such that when the input is close to "0" or "1", the distributed error value becomes small. Further, error diffusion process is not performed when the input is "0" or "1". Therefore, it is possible to significantly reduce the processing time for images which is largely occupied by the pixels of "0", such as general business documents. Further, the phenomenon of distorted contour of the image can simultaneously be solved.

The processing of the above described embodiments may be performed by a software or by using hardware circuitry.

The program for executing the process of the above described embodiments may be provided separately, and the program may be provided to the user recorded on a recording medium such as a CD-ROM, a floppy disk, a hard disk, ROM, RAM, a memory card or the like.

Further, the present invention is applicable both in a system connected to a network and a system not connected to a network environment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus, comprising:
   an input unit successively receiving, as inputs, image signals representing pixels;
   an error memory storing error values of pixels of interest;
   a determining unit determining whether an input signal represents a white pixel; and
   an error diffusion processing unit which, when the input signal represents a white pixel, outputs a signal representing a white pixel and clears the error memory of the pixel of interest so that calculation of an error and subsequent distribution of the error to pixels is not performed,
   wherein said error diffusion processing unit performs error diffusion process using a single threshold value in a binarization process smaller than a single central value of possible values of said image signal.

2. The image processing apparatus according to claim 1, wherein
   said error diffusion processing unit changes the threshold value in accordance with a magnitude of the signal input through said input unit.

3. The image processing apparatus according to claim 1, wherein
   said error diffusion processing unit performs a process of subtracting a prescribed value before distributing a calculated error, and adding the prescribed value before performing thresholding.

4. An image processing apparatus, comprising:
   an input unit successively receiving, as inputs, image signals representing pixels;
   an error memory storing error values of pixels of interest:
   a determining unit determining whether an input signal represents a black pixel; and
   an error diffusion processing unit which, when the input signal represents a black pixel outputs a signal representing a black pixel and clears the error memory of the pixel of interest so that calculation of an error and subsequent distribution of the error to pixels, is not performed,
   wherein said error diffusion processing unit performs error diffusion process using a single threshold value in a binarization process higher than a single central value of possible values of said image signal.

5. A method of image processing, comprising the steps of:
   successively inputting image signals representing pixels;
   determining whether an input signal represents a white pixel; and
   error diffusion process step of outputting a signal representing a white pixel and clearing an error memory of the pixel of interest wherein calculation of an error and subsequent distributing of the error to pixels is not performed when the input signal represents a white pixel,
   wherein said error diffusion process step performing error diffusion processing using a single threshold value in a binarization process smaller than a single central value of possible values of said image signal.

6. The method of image processing according to claim 5, wherein
   in said error diffusion process step, the threshold value is changed in accordance with a magnitude of the signal input in said input step.

7. The method of image processing according to claim 5, wherein
   in said error diffusion process step, a process is performed in which a prescribed value is subtracted before distribution of calculated error, and the threshold value is added before thresholding.

8. An image processing apparatus, comprising:
   an input unit successively receiving as inputs, image signals representing pixels;
   an error memory storing error values of pixels of interest;
   determining unit determining whether an input signal represents a white pixel or a black pixel; and
   an error diffusion processing unit which, when the input signal represents the white pixel or the black pixel, outputs a signal representing the white pixel or the black pixel and clears the error memory of the pixel of interest, wherein calculation of an error and subsequent distribution of the error to pixel is not performed,
   wherein said error diffusion processing unit performs error diffusion process using a single threshold value in a binarization process and changes the threshold value based on a relationship between the input and the threshold value, and
   wherein the relationship is that the threshold value increases depending on the increase of the input.

9. The image processing apparatus of claim 8, wherein said error diffusion processing unit performs error diffusion process using a threshold value in a binarization process smaller than a central value of possible values of said image signal when the input signal represents the white pixel.

10. The image processing apparatus of claim 8, wherein said error diffusion processing unit performs error diffusion process using a threshold value in a binarization process higher than a central value of possible values of said image signal when the input signal represents the black pixel.

* * * * *